Oct. 27, 1925.  
R. CRAIG  
1,558,843  
WEIGHT INDICATING AND PRICE COMPUTING SCALE  
Filed Oct. 28, 1919   3 Sheets-Sheet 1
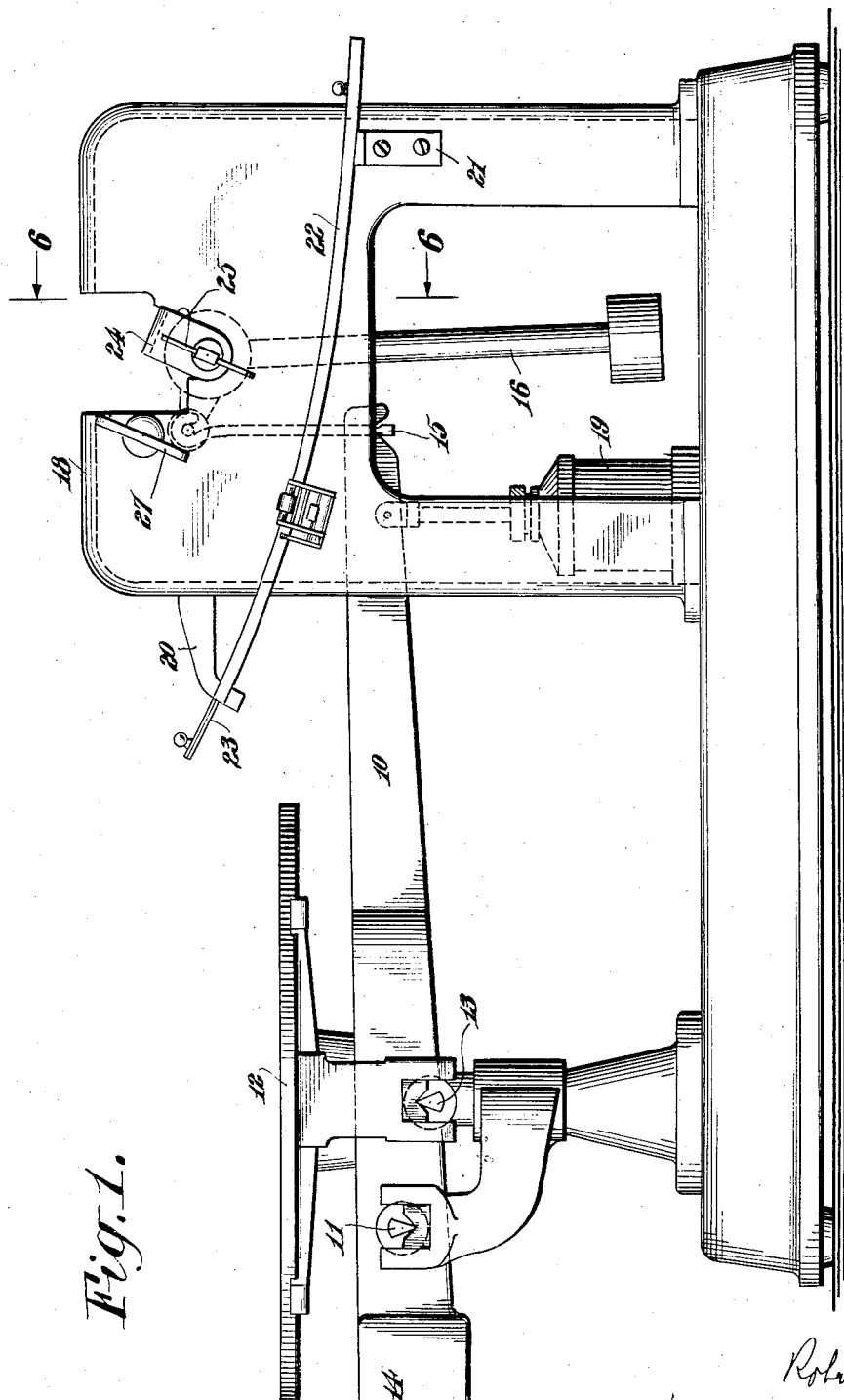

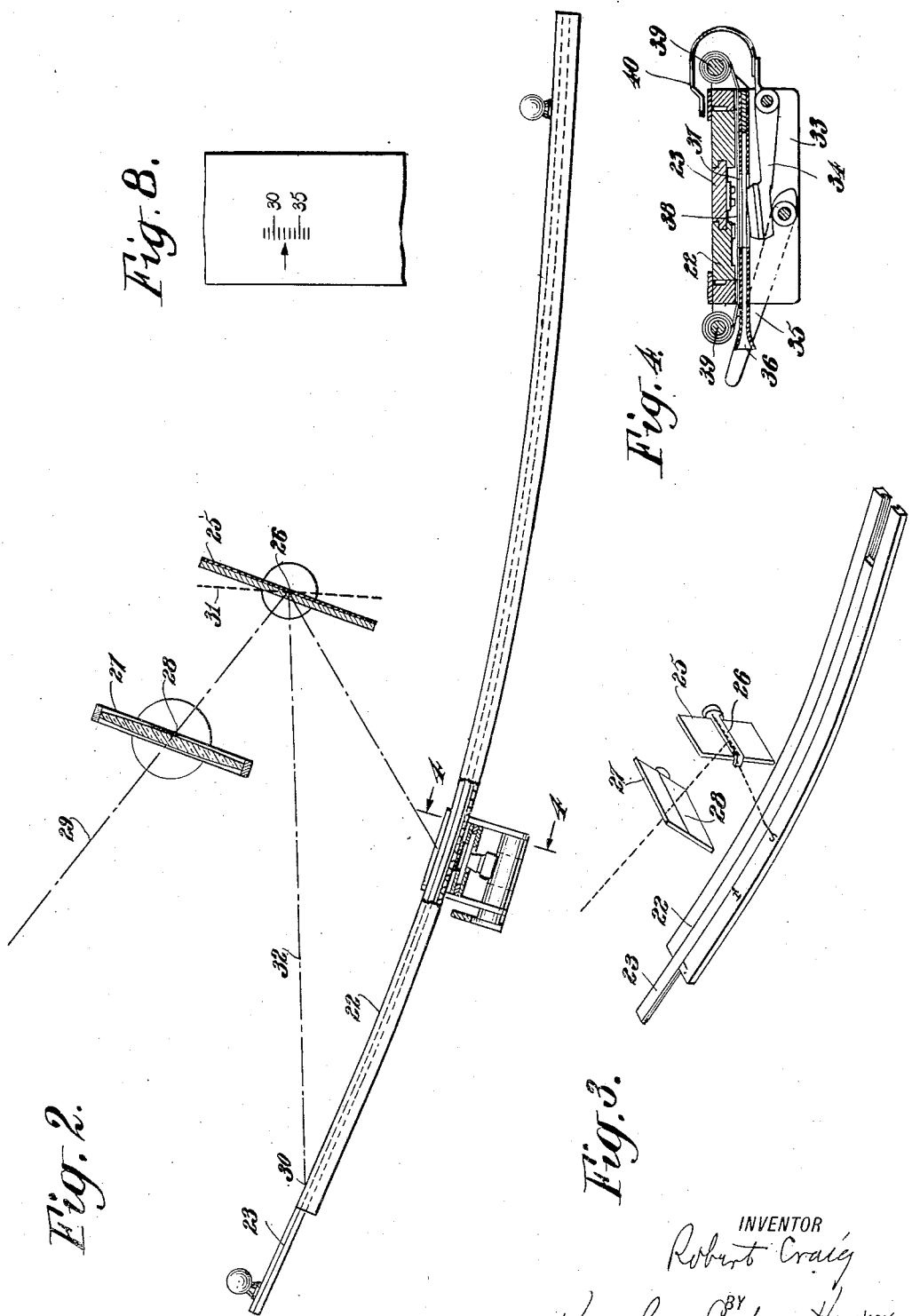

Oct. 27, 1925.
R. CRAIG
1,558,843
WEIGHT INDICATING AND PRICE COMPUTING SCALE
Filed Oct. 28, 1919
3 Sheets-Sheet 3
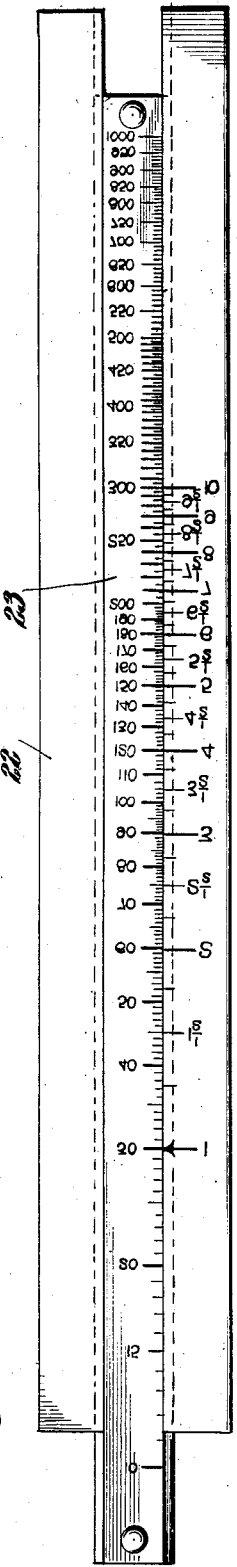
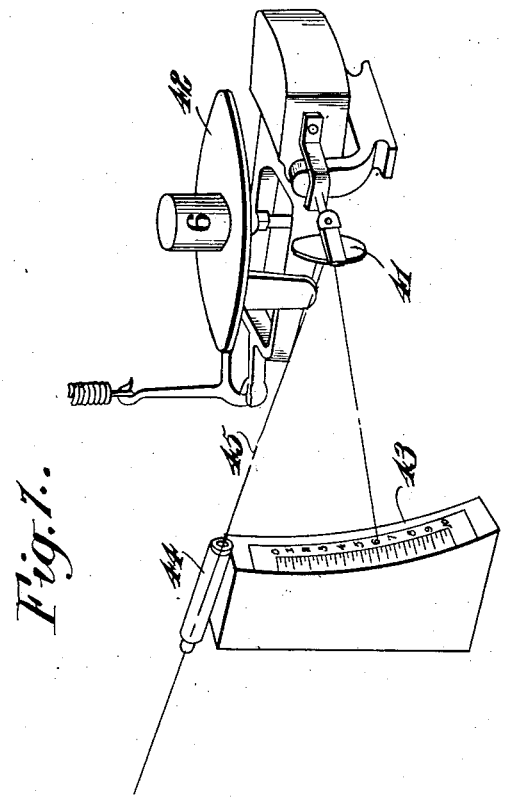
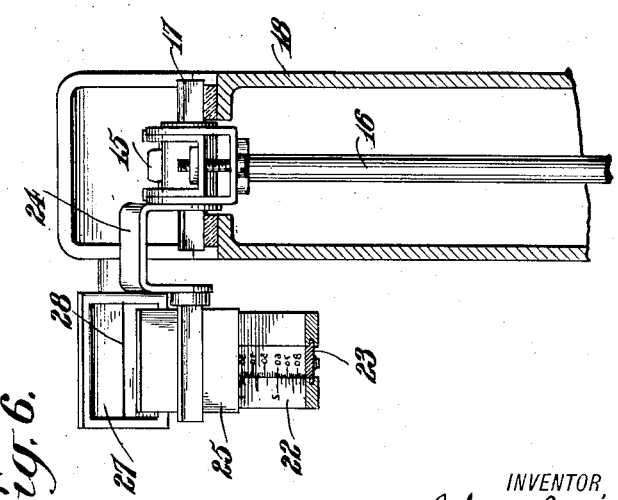
INVENTOR
Robert Craig
BY
Kerr, Page, Cooper & Hayward
ATTORNEYS Patented Oct. 27, 1925.

1,558,843

UNITED STATES PATENT OFFICE.

ROBERT CRAIG, OF ENDICOTT, NEW YORK, ASSIGNOR TO THE COMPUTING-TABULATING-RECORDING COMPANY, OF NEW YORK, N. Y., A CORPORATION OF NEW YORK.

WEIGHT-INDICATING AND PRICE-COMPUTING SCALE.

Application filed October 28, 1919. Serial No. 333,902.

*To all whom it may concern:*

Be it known that I, ROBERT CRAIG, a citizen of the United States of America, residing at Endicott, in the county of Broome and State of New York, have invented certain new and useful Improvements in Weight-Indicating and Price-Computing Scales, of which the following is a full, clear, and exact description.

In weighing scales it has long been recognized that the accuracy of the scale depends in large measure upon the amount of work which the scale has to perform. This is particularly true in computing scales, and accordingly designers have striven to make the indicating devices as light and as nearly frictionless as possible. My present invention is directed to the same end, but departs radically from prior practice in several important respects. For example, in the preferred mode of embodying the invention in a computing scale the multiplication of weight by price per unit-weight is effected by means of a logarithmic calculating device of the slide-rule type, but neither part of the slide-rule is moved by the scale mechanism. On the contrary, one member such as the slide of the calculator is adjusted by the operator to a position, with reference to a reference point on another member corresponding to the price of the commodity, and the scale then merely actuates a device which distinctively discloses a part of the calculator which is spaced a distance from the above-mentioned reference point proportional to the logarithm of the weight, whereupon the product corresponding to the sum of the logarithms of weight and price may be read at once. This form of the invention is illustrated in the accompanying drawings, in which—

Figure 1 is a side view of the complete scale.

Fig. 2 is a side view, on a larger scale and partly in section, of the calculating and indicating devices.

Fig. 3 is a perspective view of the calculating and indicating devices.

Fig. 4 is a large scale sectional view, about on line 4—4 of Fig. 2, illustrating a simple form of mechanism for printing the results of the calculation; and, if desired, the weight and price per unit-weight.

Fig. 5 is a plan view of the logarithmic calculating device.

Fig. 6 is a section on line 6—6 of Fig. 1.

Fig. 7 is a perspective view, diagrammatic in character, illustrating a simple form of the invention in which the weight only is indicated.

Fig. 8 shows a record-card bearing an imprint made by the printing devices.

In the particular embodiment shown in Figs. 1 to 6 the main lever 10 is of the third class, fulcrumed at 11 and supporting the platform or goods-support 12 on a knife-edge pivot 13.

It will be understood that the downward movement of the platform when the goods to be weighed are placed thereon is in correspondence with the weight of the goods. The platform is counterpoised by a weight 14 on one end of the lever, while the other end is connected by a link 15 to the arm of a pendulum 16 which is mounted on a knife-edge pivot 17, Fig. 6. This pendulum constitutes a load-counter-balance, as will be readily understood. A suitable housing 18 encloses the parts named and also the dashpot 19.

On the outside of the housing are two brackets 20, 21, supporting the stock of a curved slide-rule 22 having a flexible slide 23. The two parts of the slide rule have longarithmic scales as shown in Fig. 5. The curvature of the slide-rule will be explained hereinafter.

The pendulum 16 is provided at its top with a carrier 24 in the form of a yoke extending over one end of the pivot to the outside of the housing 18, and fixed on the carrier is a mirror 25, preferably flat, located in a plane passing through the axis on which the pendulum swings. On the mirror is a cross-line 26, Figs. 2 and 3, preferably in alignment with the aforesaid axis. In front of the mirror is a sighting device 27 (normally stationary but capable of rotary adjustment to position it properly with respect to the mirror and other parts) comprising a plate of glass or other transparent material, preferably a convex lens or magnifying glass having a cross-line 28.

Referring to Fig. 2, it will be seen that a flat beam of light (represented by the broken line 29) passing through the sighting device 27 at the line 28 and impinging on the mirror 25 at the line 26 will be reflected from the latter at an angle which is equal to the angle of incidence and will strike the calculating device 22 at the point 30, and striking the mirror at the line 26 will be reflected through the line 28. Hence, an observer with his eye in the line 29 will see in the mirror an image of the logarithmic scales on the slide-rule with the line 26 of the mirror superimposed thereon, and if the mirror is swung clockwise on its axis the observer will see an image of the logarithmic scales move longitudinally past the line 26, and when the mirror comes to rest, say in the position indicated by the dotted line 31, he will see the line 26 superimposed on certain divisions of the said scales. As the mirror swings, the incident beam 32 may be said to revolve around the axis 26 of the mirror (which, it will be remembered, is also the axis of the pendulum 16), its angle of swing being always twice the angle through which mirror swings, which latter angle is, in general, proportional to the weight of the goods on the platform 12. If it is desired to insure, to a higher degree of accuracy, that the deflection of the mirror shall be proportional to the weight of the commodity the usual and well-known cam and flexible strap connection between the members 10 and 17 may be adopted.

Recapitulating, the angular deflection of the mirror 25 is proportional to the weight of the commodity placed upon the scale pan. Furthermore, the angular deflection of the beam 32 is twice the angular deflection of the mirror. Therefore, the angular deflection of the beam 32 is at all times proportional to the weight of the commodity on the scale pan. As will later appear, if it is desired only to obtain a reading of total price the stock 22 need not be provided with indicia units. I prefer, however, to provide such units to indicate weight. That part of the stock 22 which the beam 32 strikes when there is one pound of goods on the scale pan is designated one and this mark is the reference line to which the slide 23 is set in accordance with the price per unit-weight of the particular commodity under consideration. Now the stock 22 is so designed that the distance along its surface, from the reference line 1 to the point where the beam 32 strikes it, is proportional to the logarithm of the weight of the particular commodity which fixes that particular position of said beam 32. Thus when two pounds are placed on the scale pan the beam 32 strikes the stock at the line 2 and the arc distance 1—2 is equal to the product of a constant times the log of two. When three pounds are placed on the scales the beam 32 strikes the stock 22 at the point 3 and the arc distance 1—3 is equal to the product of the same constant times the logarithm of three, and so on. To state this in another way the stock 22 may be said to be provided with a logarithmic scale and so curved and positioned that the number or antilogarithm indicated on that scale (such as 1, 1.5, 2, 3, etc.) by the beam 32, at any time, is equal to the number of pounds of commodity on the scale pan which places the beam 32 in that particular position.

I wish to point out that the logarithmic scale on the flexible slide 23 is laid out to the same scale of distances as the scale on the stock. Thus it will be noted that if the line 10 on the slide is placed on the line 1 on the stock the lines 20, 30, 40, 50, 60, etc., of the slide will coincide or register with the lines 2, 3, 4, 5, 6, etc., respectively, on the stock 22. Before describing a particular curve of the stock 22 which will fulfill the conditions mentioned above it will be assumed that the said stock has the correct curvature so that the operation may be described as follows.

Suppose that goods at 30 cents per pound are to be weighed. Placing the goods on the platform, the operator shifts the slide 23 until the number 30 thereon is in line with the reference line or mark on the stock; i. e., the line 1, as in Fig. 5 for example, and stations himself so that looking through the sighting device 27 he sees the two lines 28 and 26 as one, the former being superimposed on the latter. The weight of the goods on the platform deflects the mirror proportionately to their weight, and the parts having come to rest, the observer sees the lines 28, 26 (as one) across the slide-rule at such point that the distance from one of the scale on stock to the line is proportional to the logarithm of the weight of the goods. The distance on the slide, up to the 30 cent mark being proportional to the logarithm of the price per pound, it is clear that the distance on the slide, to the cross-line seen on the slide-rule, is proportional to the sum of the two logarithms. Hence, the corresponding product (or antilogarithm) is read directly on the slide. Inasmuch as the graduations are read by reflection the corresponding numerals are reversed, from right to left, as shown on Fig. 5.

Provision can readily be made for printing the value of the goods. For this purpose the underside of the slide 23, Figs. 2, 4, 5 and 6, is provided with type corresponding to the numerals on the other side, and the stock 22 is provided on its underside with a longitudinally shiftable or sliding frame or rider 33, having a pivoted platen 34 and an actuating handle 35 therefor. Between the platen and the type is a chute 36 carried by the frame to receive a card or slip of paper on which the imprint is to be made, and having an opening 37 through which the platen can operate. Between the chute and the type is an ink-ribbon 38, wrapped on spools 39, which are also carried by the frame. In use the operator slides the frame on the stock 22 until the finger 40 on the platen points to the cross-line seen on the stock, and then depresses the handle 35. This cams the platen up against the card in the chute and presses the card and ribbon against the type. When that part of the ribbon becomes depleted of ink a fresh portion is brought into position by turning one of the ribbon spools by hand. If the graduations are too close together to permit numeral-type to be used for each value graduation-type can be used for the intermediate values. In such case the platen or the handle can be provided with a properly located device to print on the card, a pointer or other character indicating the graduation which represents the value. A record of this sort is illustrated in Fig. 8, in which the 32-cents graduation is indicated by the arrow, showing that the value of the goods is 32 cents. The weight can also be printed by providing the proper type on the stock, as will be readily understood.

Where the weight alone is to be indicated the graduations corresponding to weight need not be plotted on a logarithmic scale but can take the form of equidistant marks on a circular arc, as in Fig. 7. In the latter the deflection of the mirror 41 is proportional to the weight on the platform 42 and reflects the scale 43 into a sighting device 44 so arranged that the line of sight coincides with the ray 45 reflected from the axis of the mirror.

In the particular physical embodiment described above the cross-hair or line 26 of the mirror is located at the pivotal axis of the latter. This specific construction is not essential however, as the line 26 may be spaced from the axis of the mirror. The curve of the stock 22 should, as has been previously pointed out, be such that the arc traversed thereon by the ray 32 will be proportional to the logarithm of weight on the scale pan which positions the said ray. Bearing in mind that the mirror deflection is proportional to the weight, the general differential equation of the curve of the stock to satisfy the above-mentioned conditions is as follows:

$$ds^2 = V^2 - 2c[\cot^2(A-T) - 1]V + 4v^2 - 8c\cot(A-T)v + \frac{C^2}{\sin^4(A-T)} - \frac{K^2}{T^2} = 0$$

where $V = dv/dT$; $c$ is the perpendicular distance from the origin to the fixed ray 29 (the initial position of the mirror being taken as the X-axis and the normal thereto at the pivotal point as the Y-axis); A is the angle between the fixed ray 29 and the X-axis; T is the angular deflection of the mirror; $v$ is the length of the ray 32 to the image on the scale 23; and K is an arbitrary but fixed coefficient of proportionality.

It will be seen that by locating the cross line 26 at the axis of rotation of the mirror the term $c$ becomes zero so that the above stated equation is greatly simplified and becomes:

$$V^2 + 4v^2 = K^2/T^2$$

The integration of this equation to determine the desired curvature of the stock 22 may be performed graphically by any skilled mathematician and to avoid surplusage it will not be set forth in this disclosure.

Certain broad claims readable upon the invention herein disclosed will be found in my copending application Serial No. 386,453, filed June 4, 1920 or in an application Serial No. 594,535, filed October 14, 1922, which is a division of the said application Serial No. 386,453. No claim or claims hereto appended will be found to be readable upon the invention or inventions disclosed in my said application Serial No. 386,453 or the divisional application thereof. In other words, the broad claims, common to the inventions in these three applications, are asserted in application Serial No. 386,453 or its division, and the claims in the present application are limited to the form of invention or inventions herein disclosed.

It is to be understood that the invention is not limited to the specific forms herein illustrated and described but can be embodied in other forms without departure from its spirit.

I claim:

1. In a computing scale for weighing goods and multiplying factors representing the weight of the goods and price per unit-weight, the combination with a support adapted to receive the goods and to be moved thereby; and a calculating device comprising parts capable of relative adjustment and bearing logarithmic scales upon which the factors to be multiplied can be set off; of optical means controlled by said goods support and comprising a part displaced in accordance with the weight upon said support for setting off on said calculating device the logarithm of the factor corresponding to weight on one part of the device and simultaneously on another part the sum of the logarithms of weight and of price per unit-weight.

2. In a scale for weighing goods and multiplying factors corresponding to the weight of the goods and the price thereof per unit-weight, the combination with a goods-receiver adapted to be moved thereby; of a calculating device composed of parts capable of relative adjustment, one bearing graduations representing logarithms of successively increasing weight-factors and another bearing graduations representing logarithms of successively increasing price-factors; of optical indicating means controlled by said goods receiver and displaced in correspondence with the weight of the goods on said receiver and cooperating with the calculating device to set off on the graduations of one part thereof the logarithm of the weight and simultaneously set off on the graduations of another part of the calculating device the sum of the logarithms of the two factors.

3. In a scale, the combination with a scale having a goods-receiver adapted to be actuated by the goods placed thereon; and means called into action by displacement of said goods-receiver for automatically counter-balancing variable loads upon said goods-receiver; of a relatively stationary calculating device having a stock bearing a series of graduations representing logarithms of successively increasing weight-factors and an adjustable slide bearing a series of graduations representing logarithms of successively increasing price-factors; and means having a part connected with the goods-receiver for actuation thereby in proportion to the weight of the goods, to set off on the stock of the calculating device a logarithm representing the extent of actuation of said parts.

4. A price computing mechanism comprising in combination, a slide rule settable in accordance with the price per unit-weight of a commodity, a load support, means called into action by displacement of said load support for automatically counter-balancing variable loads upon said load support, and means comprising a part controlled by the weight of a commodity upon the load support for distinctively disclosing that portion of the slide rule which indicates the product of the weight and the price per unit-weight.

5. A price computing mechanism comprising in combination, a slide-rule settable in accordance with the price per unit-weight of a commodity, a load support, means called into action by displacement of said load support for automatically counter-balancing variable loads upon said load support, an optical device controlled by the weight of a commodity upon said load support, and means comprising said optical device for distinctively disclosing that portion of the slide rule which indicates the product of the weight and the price per unit-weight.

6. A price computing mechanism comprising in combination, a plurality of logarithmic scales settable with respect to each other in accordance with the price per unit-weight of a commodity, an optical element for transmitting an image of a predetermined portion of at least one of said scales, and means actuated by the weight of the commodity for causing a deflection of said element in direct proportion to said weight.

7. In a price computing mechanism, in combination, a reflector, a load support, means called into action by displacement of said load support for automatically counter-balancing variable loads upon said load support, means actuated by the weight of a commodity upon said load support for deflecting said reflector, and a scale of such configuration that the arc traversed thereon by a ray of light received by said reflector and reflected along a predetermined fixed path is a logarithmic function of the weight.

8. In combination, a price-indicating logarithmic scale manually settable in accordance with the unit weight of a commodity, a reflector from which an image of said scale may be obtained, a load support, means called into action by displacement of said load support for automatically counter-balancing variable loads upon said load support, and means for controlling said reflector by the weight of a commodity upon said load support.

9. In combination, a calculating device, an element associated therewith, a load support, means called into action by displacement of said load support for automatically counter-balancing variable loads upon said load support, and means controlled by said load support for causing the arc traversed on said device by a predetermined ray of light passing between said device and element to be proportional to the logarithm of the weight of a commodity upon said load support.

10. In combination, a load support, means called into action by displacement of said load support for automatically counter-balancing variable loads upon said load support, a scale calibrated to functions of weight of commodities adapted to be placed upon said load support, means controlled by said load support for optically transmitting a distinctive image of that portion of said scale which corresponds to the load upon the load support, and means for producing a permanent record of the function being transmitted.

11. In combination, a weight-indicating scale, a logarithmic price-indicating scale, a load support, means called into action by displacement of said load support for automatically counterbalancing variable loads upon said load support, means comprising a movable reflector from which an image of said scales may be obtained, and means for controlling said reflector by the weight of a commodity upon the load support.

12. A computing scale comprising in combination, a load support, means called into action by displacement of said load support for automatically counterbalancing variable loads upon said load support, a reflecting element controlled by said load support and displaced in accordance with a function of the weight of a commodity upon said load support, a logarithmic calculating device manually settable in accordance with a function of a unit weight of a commodity, and means including the reflecting element controlled by said load support for distinctively disclosing that portion of said caclculating device which indicates the product of the weight and the function per unit weight for which said device has been set.

13. In combination, a load support, means called into action by displacement of said load support for automatically counterbalancing variable loads upon said load support, a movable scale calibrated to total price of commodities adapted to be placed upon said load support, means comprising a movable reflector controlled by said load support for optically transmitting a distinctive image of that portion of said scale which indicates the total price of the commodity upon the load support, and means for producing a permanent record of the total price so transmitted.

In testimony whereof I hereunto affix my signature.

ROBERT CRAIG.